United States Patent [19]

Machtig

[11] Patent Number: 5,278,596

[45] Date of Patent: Jan. 11, 1994

[54] LCD PROJECTION APPARATUS

[76] Inventor: Jeffrey S. Machtig, 500 N. Dixie Hwy., Hollywood, Fla. 33020

[21] Appl. No.: 885,513

[22] Filed: May 19, 1992

[51] Int. Cl.$^5$ ............................................. G03B 21/00
[52] U.S. Cl. ..................... 353/122; 353/94; 353/52; 359/48
[58] Field of Search ................. 353/122, 97, 119, 94, 353/52, 56; 359/48, 894, 83; 434/44

[56] References Cited

U.S. PATENT DOCUMENTS

| | | | |
|---|---|---|---|
| 4,347,507 | 8/1982 | Spooner | 434/44 |
| 4,704,660 | 11/1987 | Robbins | 362/32 |
| 4,825,341 | 4/1989 | Awai | 362/32 |
| 4,839,783 | 6/1989 | Arai | 362/374 |
| 4,912,614 | 3/1990 | Goldenberg | 353/31 |
| 4,922,385 | 5/1990 | Awai | 362/32 |
| 4,971,436 | 11/1990 | Aoki et al. | 353/31 |
| 5,022,750 | 6/1991 | Flasck | 353/31 |

Primary Examiner—William A. Cuchlinski, Jr.
Assistant Examiner—William C. Dowling
Attorney, Agent, or Firm—Malin, Haley, DiMaggio & Crosby

[57] ABSTRACT

A novel projection apparatus comprised of a projector mountable on a frame for projection of a video image onto any appropriate screen, a high intensity projection light source remote from said projector such that heat from said light source is not transferred appreciably to the projector, and optical light transmission means connecting the high intensity light source with the projector. The projector may be movable, e.g., pivotable and/or translatable, in which case appropriate structure may be included to enable such movement of the projector while still providing ample light to the projector.

4 Claims, 6 Drawing Sheets

LCD PROJECTION APPARATUS

BACKGROUND OF THE INVENTION

1. Field of the Invention

This invention relates generally to LCD projection apparatus and, more particularly, relates to an apparatus for projecting an LCD-generated image where the light source is thermally separated from the LCD means, yet is optically connected thereto.

2. Description of the Prior Art

In the field of projecting, particularly using the LCD format, it is desirable to maintain the LCD panel at a low temperature relative to the required projection light source to avoid degradation of the LCD panel due to exposure to the heat from the projection light source, which ultimately leads to the degradation of the projected image.

In addition, state of the art projection systems still use a high intensity light source in direct proximity to the image-generating apparatus, and attempt to cool said light source and image-generating apparatus utilizing an air flow drawn from the exterior of the device, which results in the introduction of undesired debris into the projection system.

Still further, when a moving projector is utilized, as in visual simulation applications, a light source used to illuminate the projection apparatus is caused to move commensurately, sometimes violently. This movement leads to premature rupture of the filament in the light source and consequent failure of the light source.

Still further, it is desirable in certain applications to limit the size of the projection apparatus per se, wherein placing the light source at a remote position with respect thereto would prove highly beneficial.

The inventor is not aware of any attempts to separate the LCD panel from the heat generated by the projection light source. An article entitled "Projection Selection" by Doug McElroy, Video Systems, January 1992, proposes to remove heat from the area between the lens and the CRT imaging apparatus. Others use a separate light source chamber where the light energy generated therein is conveyed exteriorally thereof by optical fibers, themselves arranged in artistic patterns or used to illuminate signs. The only known efforts in this latter regard are disclosed in U.S. Pat. No. 4,922,385 to Awai, U.S. Pat. No. 4,839,783 to Arai, U.S. Pat. No. 4,825,341 to Awai, and U.S. Pat. No. 4,704,660 to Robbins. The disclosure in each of the foregoing patents, however, relates expressly to ornamental-type fiber optic display devices (with the exception of the patent to Arai) and, therefore, do not provide a solution to the problem of heat degradation of LCD panels used for LCD projection. Arai teaches a spotlight having a pivotally separable housing and a cooling feature.

SUMMARY OF THE INVENTION

It is therefore a principal object of the present invention to provide a projection apparatus wherein the image generator is disposed remotely from the projection light source so as to avoid heat degradation of the image generator.

It is also an object of the present invention to provide an LCD projection apparatus, wherein the LCD panel is provided with light from a projection light source via any convenient light transmission means from a remote projection light source.

It is a still further object of the present invention to provide a self-cooling projection light source for providing high intensity, low temperature light to a projection apparatus.

In accordance with these and other objects, there is provided herein a novel projection apparatus comprised of a projector mountable on a frame for projection of a video image onto any appropriate screen, a high intensity projection light source remote from said projector such that heat from said light source is not transferred appreciably to the projector, and optical light transmission means connecting the high intensity light source with the projector. The projector may be movable, e.g., pivotable and/or translatable, in which case appropriate structure should be included to enable such movement of the projector while still providing ample light to the projector. Although this disclosure addresses LCD projection specifically, the scope hereof is not intended to be so limited. It is to be understood that any other projection technology which utilizes a high intensity light source may benefit herefrom. Also, although this disclosure uses optical fiber as the optical light transmission means, any structure which carries out the intended purpose of conveying high intensity light from a remote light source to a projector is contemplated. Furthermore, the term "optical fiber" will be used throughout this disclosure as a generic term to refer to any type of material designed to transmit, or conduct, light through it, including glass fiber optic strands, polymerized plastics, or any other material that is or may become known.

In the preferred embodiment, the light source is a light-tight housing having a high intensity light source, means for energizing the light source, appropriate light focusing, directing and attenuating structure for channeling the light into the optical fiber, and means for cooling the interior of the light source housing, preferably by convective heat transfer.

The optical fiber may itself be thermally insulated, as is known in the art, to prevent heat related deterioration. The optical fiber directs high intensity light from the light source housing to the projector. Since it may be desirable to provide a movable projector, appropriate coupling of the optical fiber with the projector is provided, such as a movable knuckle, without permitting any appreciable decrease in light transmission quantity or quality.

Any appropriate control and logic apparatus may be employed for controlling light intensity or other optical/projection parameters. It is preferred to house any such components which give off heat remote from the projector, such as in the light source housing. Telemetric or hard wiring electrical connection may be employed as needed.

By using a remote light source, it is possible to provide on the order of twice as much light to a projector because a higher intensity light source can be used, since the higher level of heat energy given off by a higher intensity light source is disposed remotely from the projector.

In accordance with these and other objects which will become apparent hereinafter, the instant invention will now be described with particular reference to the accompanying drawings.

DETAILED DESCRIPTION OF THE PREFERRED EMBODIMENT

Figure 3:
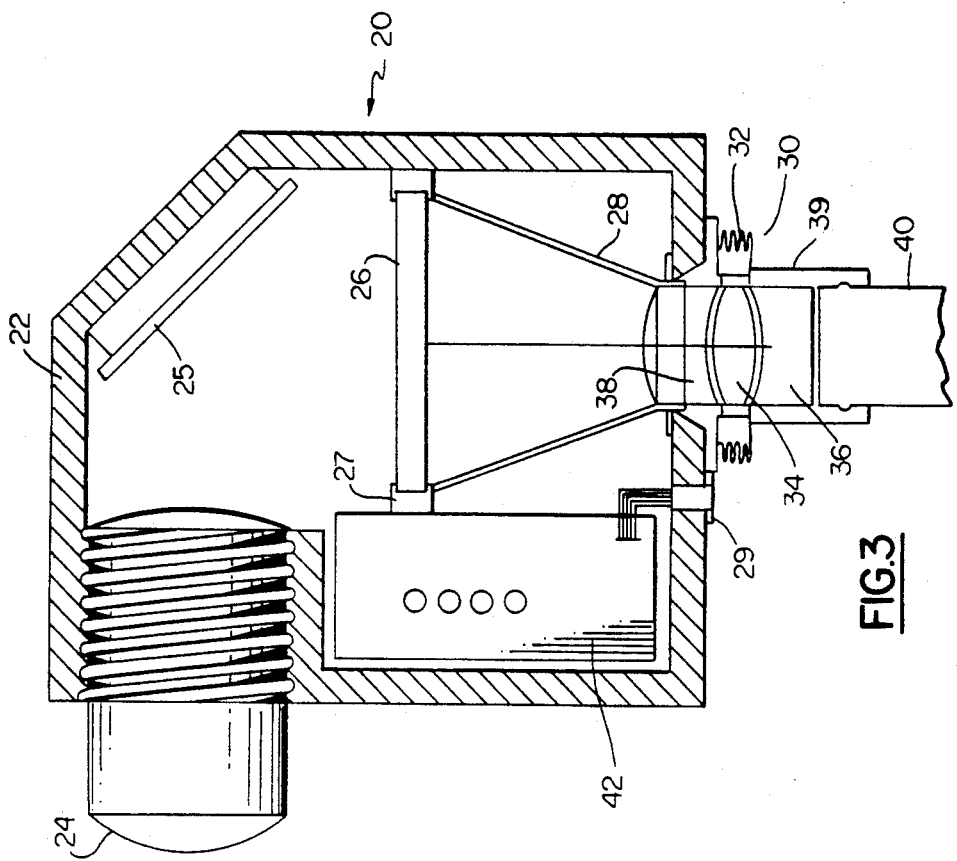
FIG. 3 is a cross sectional elevational view of the projector used with the preferred embodiment of the instant invention.
Figure 1:
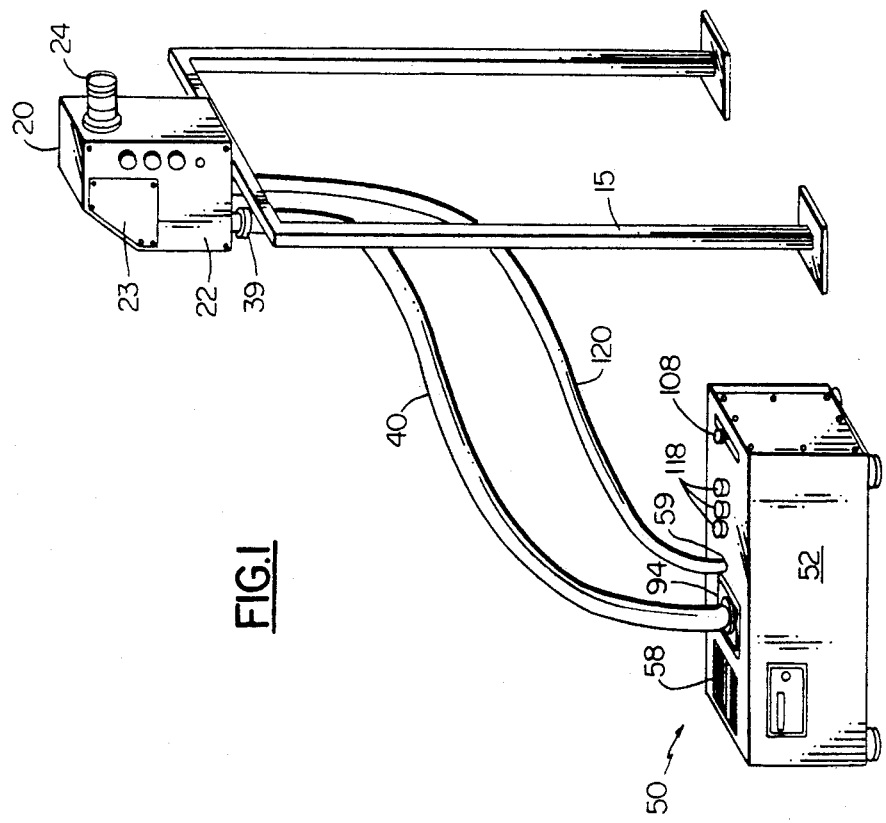
FIG. 1 is a perspective view of an assembled LCD projection apparatus in accordance with the instant invention.
Figure 2:
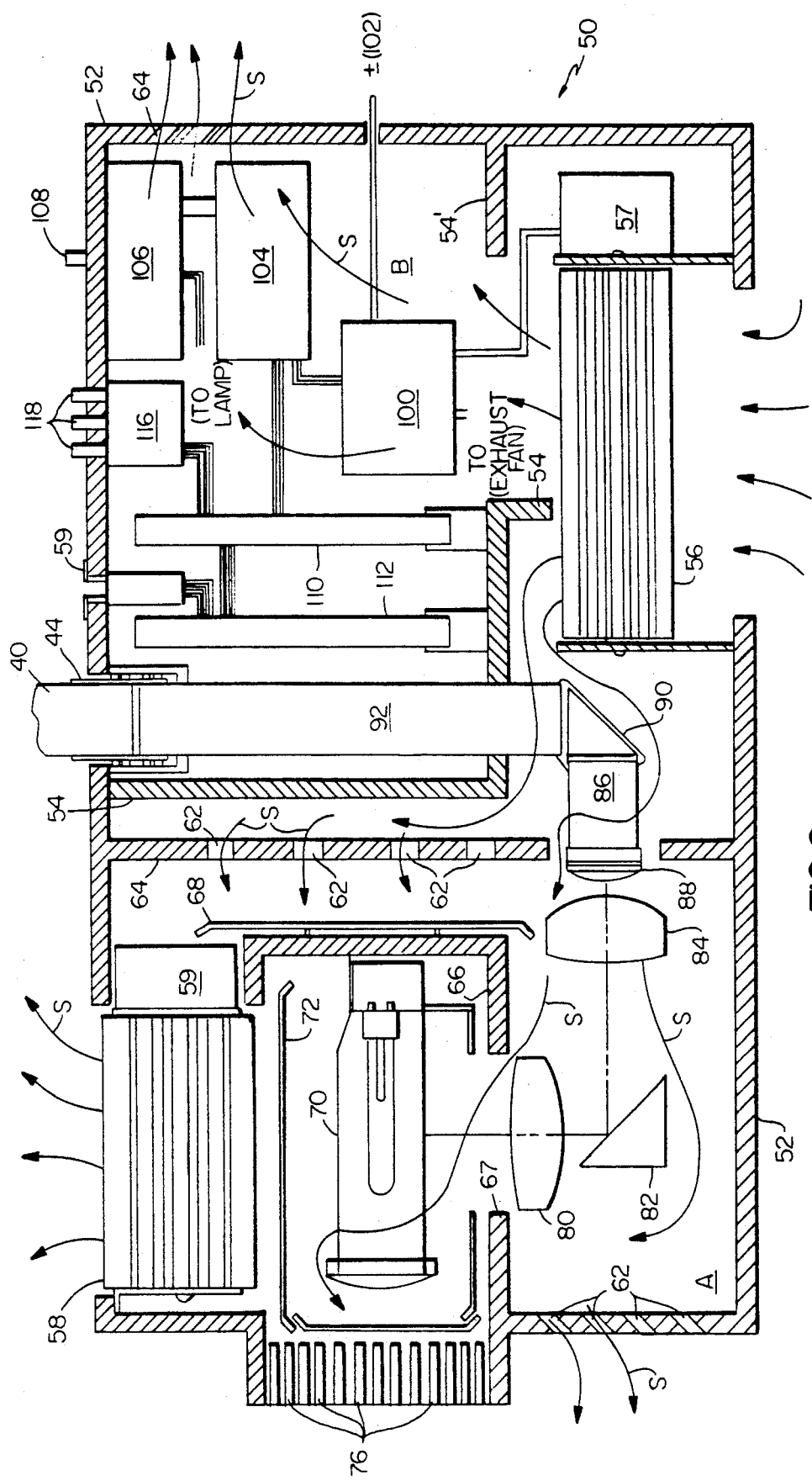
FIG. 2 is a cross sectional view of the remote light source of the projection apparatus of the instant invention.

FIGS. 1 through 3 show the preferred, generalized, embodiment of my invention. I utilize an LCD projector 20 which is comprised of a projector housing 22, a projection lens 24, which may be an adjustable wide angle zoom lens 24, an LCD display panel 26, a light containment shroud 28, and a pivotable optical coupling 30 communicating optical fiber 40 with optical arrangement 28.

The LCD video signal electronics and video image controls 42 may be provided within housing 22 and electronically connected to LCD panel 26 via connector 27 and to a remote power and logic supply in a manner to be set forth hereinbelow via connector 29.

Optical coupling 30 is, in the preferred embodiment, comprised of an accordion-like outer cover 32 covering first, second and third coupling lenses 34, 36 and 38, respectively. Because first coupling lens 34 is concave on both optical surfaces thereof, and second and third coupling lenses 36 and 38 are commensurately concave and disposed in confronting relationship to the convex surfaces of first coupling lens 34, high quality light transmission occurs from optical fiber 40 to LCD panel 26 through a substantial range of circumferential movement of first, second and third coupling lenses 34, 36 and 38 with respect to one another. In this way, projector 20 may be made to pivot about coupling 30 if desired.

An optical mirror 55 is disposed within housing 22 for reflecting the LCD-generated image from panel 26 through projecting lens 24. Any suitable means for conveying the LCD-generated image through the projecting lens is contemplated.

Optical fiber 40 is coupled to second coupling lens 36 via connector 39, which may be any of the connectors known in the art or to become known. Connector 39 should be opaque so as to preclude the escape of light radially therefrom.

Referring now specifically to FIG. 2, there is shown a remote high intensity projection light source 50 comprised, preferably but not by way of limitation, of a housing 52 defining a plurality of openings therein. Housing 52 is divided into a two-part interior, part A and part B, part A comprising the light source structure and part B housing the electronics and controls. Generally impervious dividing wall 54 divides the interior of housing 52 into parts A and B. Cooling throughout parts A and B is provided by inlet fan 56, which is activated by inlet fan motor 57, outlet apertures 62 and 64 defined by housing sections A and B respectively, and outlet fan 58, which is motivated by outlet fan motor 59. A plurality of through apertures 62 are preferably provided in secondary dividing wall 64 to facilitate cooling air flow S in part A of housing 52. Secondary dividing wall 64 acts primarily as a light blocking structure.

A lamp housing 66 is provided within part A of housing 52 and is shielded to the right in FIG. 2 by a low emissivity heat shield 68. Light housing 66 generally surrounds high intensity lamp 70, which may be halogen or any other known, or to be known, source of light. Additional heat shielding 72 as known in the art may be employed in surrounding relationship about lamp 70. A plurality of cooling fins 76 or other heat transfer apparatus may be disposed adjacent lamp housing 66 and lamp 70 to facilitate the transfer of heat away from lamp 70. Selection of lamp wattage depends on the needs of the application. For example, a 500-watt lamp may be used to provide a very high level of light intensity. Higher or lower wattage light sources may be employed.

Lamp housing 66 defines an aperture 67 through which light energy is intended to pass to first light collecting and focusing lens 80, and thereafter through dichroic mirror 82 which filters out unwanted lamp hue colors. Light thereafter passes through second light collecting and focusing lens 84, and in turn enters first optical fiber 86 through optical fiber receiving lens 88. The light is then reflected via a 45° sealed prism 90 or the like into second optical fiber 92 for ultimate transmission to primary optical fiber 40. Second optical fiber 92 is connected to primary optical fiber 40 with coupling 94, which may be of the type known, or to be known, in the art, and should not permit the radial transmission of light therethrough.

Part B of housing 52 employs, preferably, a 120-volt, 60-hertz transformer energized by a remote power source 102. Transformer 100 powers intake blower fan 57 and outlet blower fan 59, as well as a 12-volt power module 104 which modulates power to the LCD display panel 26, lamp 70 and processors 110 and 112. Power module 104 provides power to lamp rheostat 106, which in turn provides adjustable power to lamp 70. Rheostat slider 108 is used to vary the power output of rheostat 106 to lamp 70. Power module 104 also provides power to RGB signal processor 110 and video signal processor output 112. An RGB signal is input from a remote playback source (not shown) to RGB modulator 116 via digital RGB connector (if high resolution video graphics are used) or other coupling means 118. A video output signal and power for projector 20 is output via connector 59 to electrical conduit 120, which in turn is electrically connected to coupling 29 for connection to video signal electronics and video image controller 42.

Figure 6:
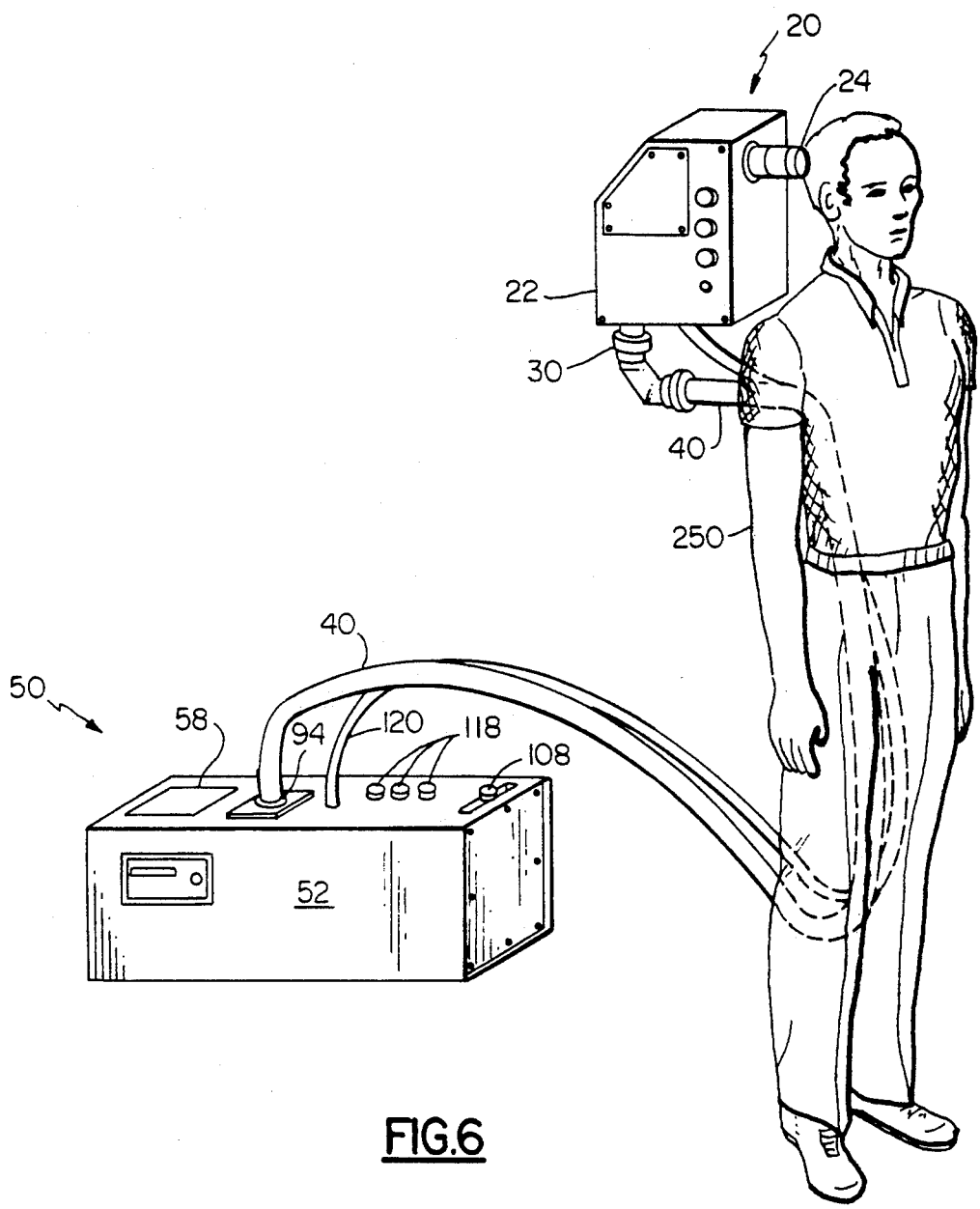
FIG. 6 is a second alternative embodiment of the projection apparatus of the instant invention.

Projector 20 may be mounted to any appropriate mounting device such as frame 15 as shown in FIG. 1 or to video mannequin 250 as shown in FIG. 6.

Figure 4:
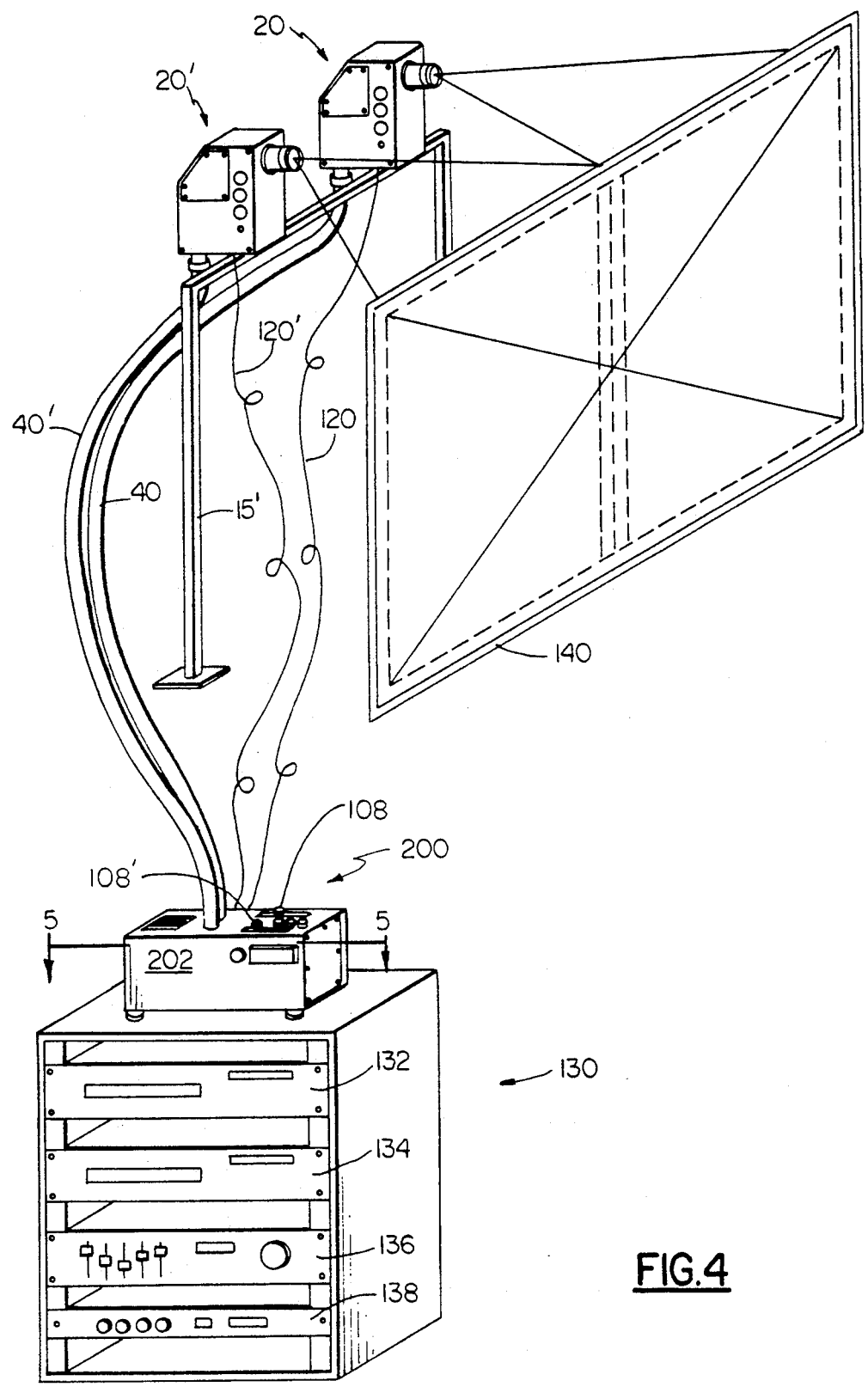
FIG. 4 is a first alternative embodiment of the projection apparatus of the instant invention.
Figure 5:
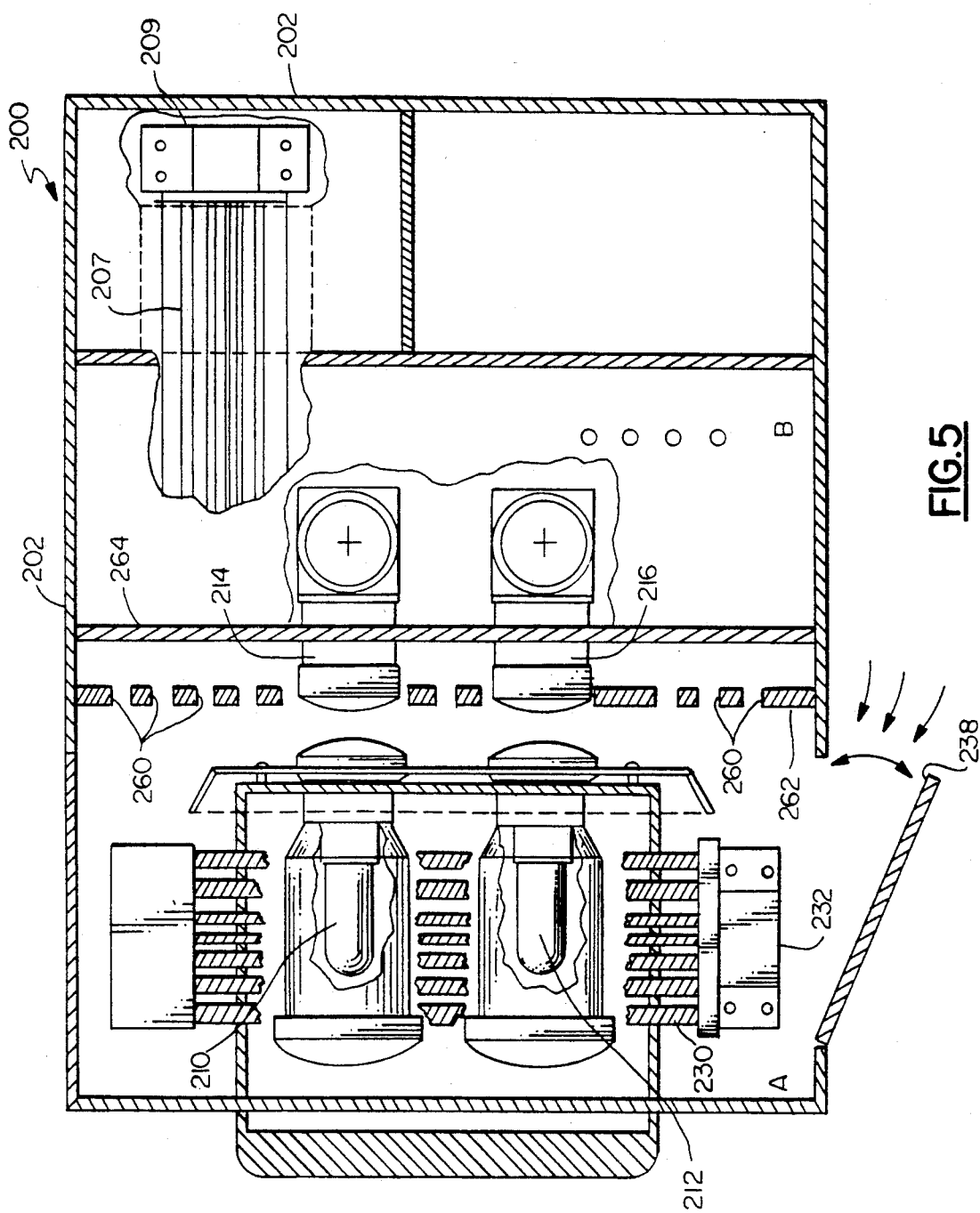
FIG. 5 is a diagrammatic representation of a light source for use when two LCD projectors are employed, as in the first alternative embodiment of the invention.

As shown in FIGS. 4 and 5, a light source 200 of the instant invention may be utilized with more than one projector, such as dual projectors 20 and 20'. Although FIG. 4 shows two projectors 20, 20' virtually identical to the structure shown in FIG. 3, it is contemplated that more than two such projectors, or the equivalents thereof, will be used with a single light source 50. In the embodiment shown in FIGS. 4 and 5, projectors 20 and 20' are used to project onto a projection screen 140. Projectors 20 and 20' may be mounted to frame 15' as shown, or may be mounted to two distinct video mannequins, one of which is shown in FIG. 6 as reference numeral 250.

Video playback sources such as video disc players 132 and 134 shown in FIG. 4 may be used to provide an electronic video signal source for electronic conveyance to the electronics portion (part B) of housing 202 via input means 118. Playback controls embodied in controllers 136 and 138 may also be utilized. Digital video imaging or any other known means of storing and replaying animated or still images may also be utilized.

FIGS. 4 and 5 show a modified light source 200 comprised of housing 202 used for a dual lamp arrangement. Housing 202 is divided into a part A and a part B. Part B thereof is substantially the same as part B of housing 52 shown in FIG. 2, with the exception that the controller 106 is used to power, selectively and/or alternatively if desired, a pair of lamps 210 and 212. First lamp 210 is used to illuminate a first projection apparatus 20, which is substantially the same as the projection apparatus shown in FIG. 3, while second lamp 212 is used to illuminate a second LCD projection apparatus 20', which likewise is similar to the LCD projection apparatus shown in FIG. 3. Appropriate means for communicating light energy from lamps 210 and 212 to the respective projection apparatus are shown at 214 and 216, respectively, and are similar to the arrangement shown in FIG. 2, reference numbers 80 through 92. Further, additional lamps may be employed to illuminate more than two projection apparatus, the number of lamps being limited only by the parameters of the control apparatus being used.

A pair of light communicating means such as fiber optic cables 40, 40' communicating light energy from lamps 210, 212, respectively, to projectors 20, 20'. Inlet fan 207 draws cooling air into housing 202 using fan motor 209. Exhaust fan 230 expels air from part A of housing using fan motor 232. The precise arrangement of air moving apparatus 207, 209, 230 and 232 and air flow apertures 260 in secondary dividing wall 262 shown is considered to be preferred, but only exemplary. Any known, or to be known, structure may be employed.

Additional air inlets such as duct 238 may be employed to provide a sufficient flow volume for enhanced convective heat transfer.

Figure 7:
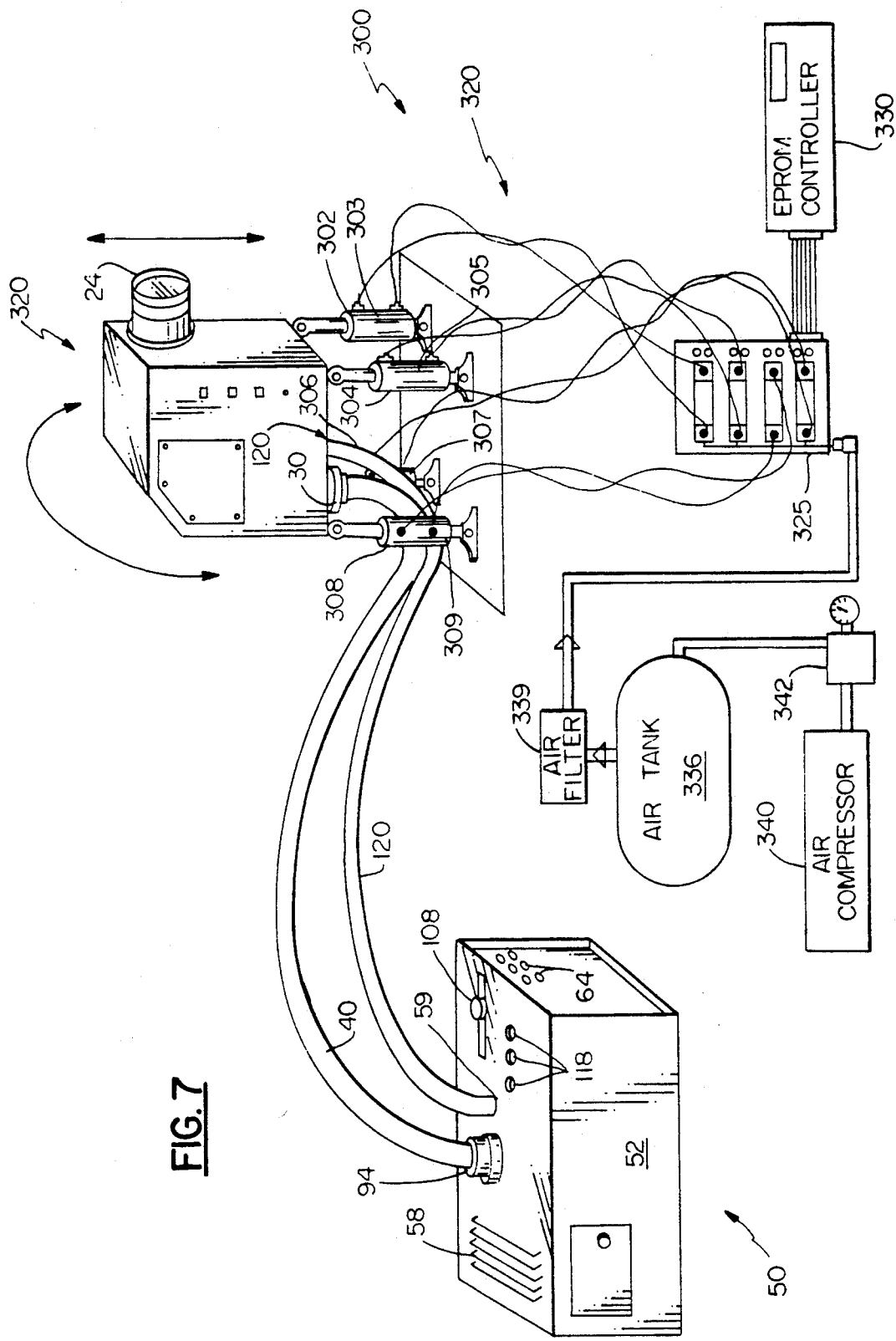
FIG. 7 is a third alternative embodiment of the invention.

FIG. 7 shows a third alternative embodiment of the instant invention wherein a movable projector 320 is used in connection with the remote light source 50 of FIG. 2. Modifications may be necessary to the electronics in control part B of light source 50 to control projector motion apparatus 300. Projector motion apparatus 300 is comprised of a plurality of extendable and retractable leg members 302, 304, 306 and 308. Legs 302, 304, 306 and 308 incorporate pneumatic cylinders 303, 305, 307 and 309 which are connected via appropriate flexible conduits 320 as known in the art. Conduits 320 connect said pneumatic cylinders to an air solenoid manifold 325, which is controlled by an EPROM controller 330. Manifold 325 is communicated with a supply of compressed air from air tank 336 via conduit 338. An air filter 339 may be employed in conduit 338 between air tank 336 and manifold 325. An air compressor 340 may also be employed to replenish the supply of compressed air in tank 336. An air pressure regulator means 342 may also be employed to regulate the air pressure within tank 336. Further, means may be provided to automatically replenish compressed air within tank 336 upon the air pressure therein decreasing to a predetermined point. Any other means for moving projector 320 rectilinearly is contemplated as being within the scope of this invention. Therefore, any known means or means which becomes known hereinafter, may be employed by one skilled in the art.

It can be seen that vigorous movement of projector 320 will not affect the lamp 70 within housing 52. In this way, premature failure of the filament therein will not be caused. Further, the heat generated by the light source is maintained completely separate from projector 320. Still further, any debris drawn in by fan 56 while cooling the interior of housing 52 will not come into contact with the delicate imaging components within projector 320.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An LCD projection apparatus comprising:
   means for projecting LCD generated images;
   means for illuminating said means for projecting disposed remote from said means for projecting;
   means for conveying light energy from said means for illuminating to said means for projecting, said means for illuminating comprising:
   lamp means;
   means for communicating light energy from said lamp means to said means for conveying;
   housing means;
   means for reducing the temperature within said housing; and
   an LCD projection control apparatus disposed within said housing.

2. The apparatus of claim 1, wherein said means for communicating comprises at least one focusing lens, and at least one right angle prism.

3. An LCD projection apparatus comprising:
   means for projecting LCD generated images;
   means for illuminating said means for projecting disposed remote from said means for projecting;

4. The apparatus of claim 3, wherein said first and second means for communicating each comprise at least one focusing lens and at least one right angle prism.
   means for conveying light energy from said means for illuminating to said means for projecting, said means for illuminating comprising:
   a first lamp means and a second lamp means;
   first means for communicating light energy, said first light energy communicating means for communicating light energy from said first lamp means to said means for conveying;
   second means for communicating light energy, said second light energy communicating means for communicating light energy from said second lamp means to said means for conveying;
   housing means;
   means for reducing the temperature within said housing; and
   an LCD projection control apparatus disposed within said housing.

* * * * *